(12) United States Patent
Ramarao et al.

(10) Patent No.: US 8,266,224 B2
(45) Date of Patent: *Sep. 11, 2012

(54) APPLICATION GATEWAY DEVICE

(75) Inventors: Karempudi Ramarao, San Ramon, CA (US); Pranta Das, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 472 days.

This patent is subject to a terminal disclaimer.

(21) Appl. No.: 12/128,852

(22) Filed: May 29, 2008

(65) Prior Publication Data

US 2009/0300116 A1    Dec. 3, 2009

(51) Int. Cl.
*G06F 15/16* (2006.01)
(52) U.S. Cl. ........ 709/206; 709/223; 709/234; 717/104; 717/136; 719/313
(58) Field of Classification Search .................. 709/206, 709/223, 234; 717/104, 136; 719/313
See application file for complete search history.

(56) References Cited

U.S. PATENT DOCUMENTS

| | | | |
|---|---|---|---|
| 2003/0018512 A1* | 1/2003 | Dortmans | 705/9 |
| 2003/0110379 A1 | 6/2003 | Ylonen | |
| 2004/0083448 A1* | 4/2004 | Schulz et al. | 717/101 |
| 2004/0193694 A1 | 9/2004 | Salo | |
| 2005/0166187 A1* | 7/2005 | Das et al. | 717/136 |
| 2006/0123425 A1* | 6/2006 | Ramarao et al. | 719/313 |
| 2007/0150075 A1* | 6/2007 | Dumas et al. | 700/29 |

OTHER PUBLICATIONS

Frank Vahid, "The Softening of Hardware," Computer, vol. 36, No. 4, pp. 27-34, Apr. 2003, doi:10.1109/MC.2003.1193225.*

Steve McConnell, "Who Needs Software Engineering?," IEEE Software, vol. 18, No. 1, pp. 5-8, Jan./Feb. 2001, doi:10.1109/MS.2001.903148.*

Andrew Tanenbaum, Structured computer organization; (2nd ed.), Prentice-Hall, Inc., Upper Saddle River, NJ, 1984.*

Ashton, et al., Application Delivery with Cisco ACE Application Control Engine. Published by Cisco [online]. [retrieved on Sep. 29, 2008]. pp. 1-13. Retrieved from the Internet: <URL: http://www.cisco.com/en/US/prod/collateral/modules/ps2706/ps6906/prod_brochure0900aecd806a7dd9.pdf>.

F5 Networks. BIG-IP Hardware: Application Switches. BIG-IP Series [online]. Published by F5 Networks. 2008 [retrieved on Sep. 29, 2008]. pp. 1-4. Retrieved from the Internet: <URL: http://www.f5.com/pdf/products/big-ip-platforms-ds.pdf>. Seattle, Washington, USA.

(Continued)

*Primary Examiner* — Phuoc Nguyen
*Assistant Examiner* — June Sison
(74) *Attorney, Agent, or Firm* — Hickman Palermo Truong Becker Bingham Wong LLP

(57) ABSTRACT

In an embodiment, a data processing system comprises application workflow optimizing logic and which when executed is operable to receive first workflow data that defines a sequence of processing operations to perform on an application-layer message; rewrite the first workflow data by separation of dependent update operations to result in creating rewritten workflow data; and store the rewritten workflow data in a data repository. Application gateway logic may be operable to receive one or more packets; construct a received message from one or more payloads of the packets; classify the received message to identify a particular workflow associated with the message; apply the particular workflow, using the rewritten workflow data, to the received message to result in identifying a destination application server and creating an outgoing message; send the outgoing message to the destination application server.

28 Claims, 7 Drawing Sheets

OTHER PUBLICATIONS

IBM, Business Process Execution Language for Web Services version 1.1., IBM [online]. Published by IBM, Feb. 2007 [retrieved on Oct. 6, 2008]. 1 page. Retrieved from the Internet: <URL: http://www.ibm.com/developerworks/library/specification/ws-bpel/>.

Oasis. Web Services Business Process Execution Language Version 2.0., Published by Oasis [online]. Aug. 23, 2006 [retrieved on Oct. 6, 2008]. pp. 1-138. Retrieved from the Internet: <URL: http://docs.oasis-open.org/wsbpel/2.0/wsbpel-specification-draft.html>.

* cited by examiner

APPLICATION GATEWAY DEVICE

TECHNICAL FIELD

The present disclosure generally relates to computer devices used in network management. The disclosure relates more specifically to techniques for mediating communication between clients and business logic applications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

An Application Gateway acts as an intermediary between business logic applications such as inventory control, human resources applications, or others. An intermediary is used to enable communication among applications that have non-standard interfaces. Furthermore, in some cases a core set of functions is implemented in each application independently, and valuable resources and many operational difficulties can be reduced by centralizing such functions at an application gateway.

Existing Application Gateway products are primarily implemented as application software that the user runs on a server. Thus, they operate at the level of sockets and messages. As a result, past application gateway products have introduced delays or latency in communications among applications. Examples of prior products include the Cisco Application Control Engine (ACE) from Cisco Systems, Inc., which is operable at Layer 2 or Layer 3 but not Layer 6 and higher layers; the BIGIP unit from F5; and products from Citrix, Juniper Networks, Tuxedo, and the Web Services Business-to-Business Gateway from IBM.

DETAILED DESCRIPTION

Figure 1:
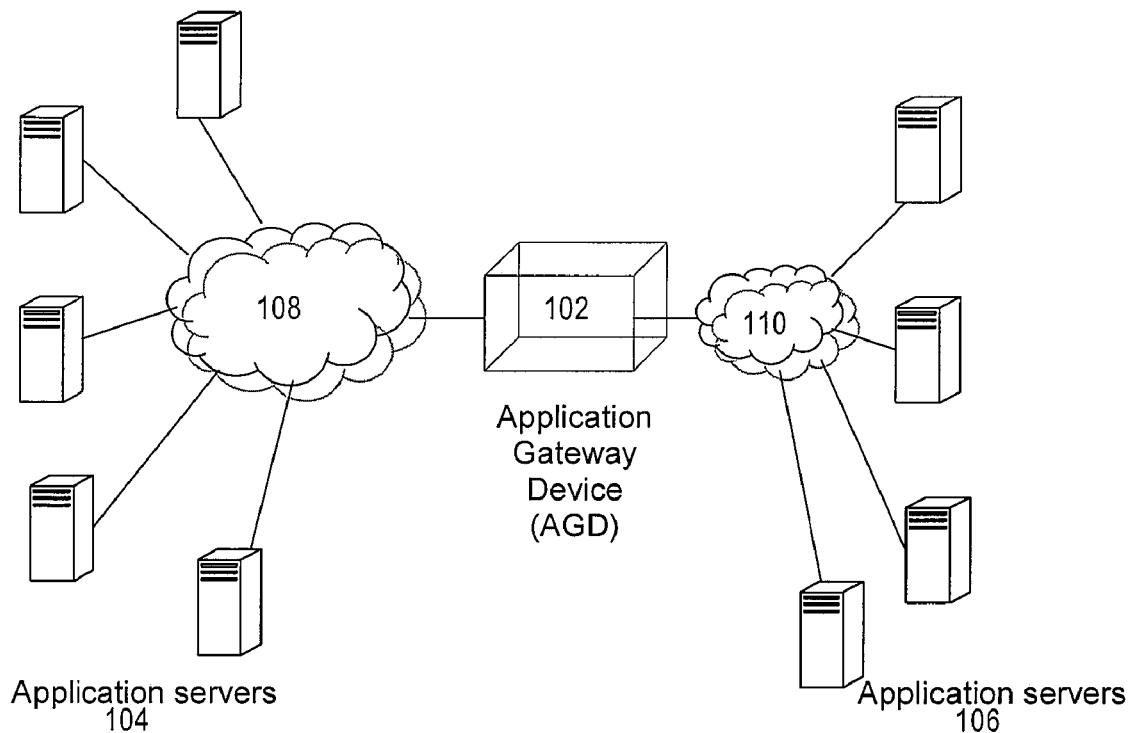
FIG. 1 illustrates an application gateway device in a network.

In the following description, for the purposes of explanation, numerous specific details are set forth in order to provide a thorough understanding of the disclosure. It will be apparent, however, to one skilled in the art that embodiments may be practiced without these specific details. In other instances, well-known structures and devices are shown in block diagram form in order to avoid unnecessarily obscuring the disclosure.

In one embodiment, the disclosure provides an Application Gateway Device having minimal latency that is obtained through a pre-analysis of the work-flow graphs and incremental processing of message fragments. The architecture of the AGD is optimized for processing streaming data using network technology. As a result, in a deployment, the presence of the AGD is as transparent to the applications running on application servers as possible, in part by minimizing the latency caused by the AGD on each message it processes.

In an embodiment, the AGD comprises a Work-flow engine. A work-flow can be viewed as a directed graph in which nodes represent operations applied to a message and links represent the ordering of the operations. In an embodiment, a pre-analysis process for the work-flows is performed that leads to a rearrangement of the work-flow graphs into rewritten, functionally equivalent, highly parallelized work-flow graphs. When a new or rewritten work-flow is applied to a message, the new workflow ensures that outgoing packets are dispatched as early as possible. In an embodiment, incremental processing of messages is performed in each major functional unit of the AGD. As a result, there is no need to fully assemble messages, which can be time-consuming, and the disclosed AGD can process incremental message portions that are received in streaming fashion.

Embodiments are described herein according to the following outline:

1.0 General Overview
    2.0 Application Gateway Device Structural and Functional Overview
        2.1 Architecture and Workflow Examples
        2.2 Pre-Analysis of Workflow
        2.3 Workflow Rewriting
        2.4 Run-time Message Processing
    3.0 Implementation Mechanisms—Hardware Overview
    4.0 Extensions and Alternatives
    1.0 General Overview In an embodiment, a data processing system comprises application workflow optimizing logic coupled to a network and which when executed is operable to receive first workflow data that defines a sequence of processing operations to perform on an application-layer message in a network; rewrite the first workflow data by separation of dependent update operations to result in creating rewritten workflow data; store the rewritten workflow data in a data repository that is coupled to the network; application gateway logic coupled to the data repository and to the network and operable to: receive one or more packets from the network; construct a received message from one or more payloads of the packets; classify the received message to identify a particular workflow associated with the message; apply the particular workflow, using the rewritten workflow data, to the received message to result in identifying a destination application server and creating an outgoing message; send the outgoing message to the destination application server.

In an embodiment, the rewriting further comprises rewriting the first workflow data by parallelization of trailing computation operations. In an embodiment, the rewriting further comprises rewriting the first workflow data by parallelization of leading computation operations. In an embodiment, the rewriting further comprises rewriting the first workflow data by branch prediction.

In an embodiment, the application gateway logic is further operable to classify the received message using one or more incremental classification operations, wherein each of the incremental classification operations operates on one or more parts of the packets as the one or more packets are received. In an embodiment, the application gateway logic is operable to apply one or more updates, which are defined in the rewritten workflow data, to the received message incrementally as the one or parts of the packets are received.

In an embodiment, the application gateway logic is operable to send the outgoing message to the destination application server before receiving all packets of the received message. In an embodiment, the application-layer message, the received message, and the outgoing message are Layer 6 messages or Layer 7 messages.

In other embodiments, the disclosure encompasses a machine-implemented method, other computer apparatus, and a computer-readable medium configured to carry out the foregoing steps.

In an embodiment, an application gateway device is configured to perform incremental processing of message fragments or packets at each step in the process disclosed herein, and is configured to perform pre-analysis of work-flows to rearrange the steps in a way that optimizes the end-to-end delays incurred in the AGD. As a result, in an embodiment an AGD can be deployed in a high volume, dynamic environment of a real-time enterprise and can perform tasks essentially transparently with respect to the applications and with minimal delay in the transport of messages between application servers.

2.0 Application Gateway Device Structural and Functional Overview 2.1 Architecture and Workflow Examples FIG. 1 illustrates an application gateway device in a network. In the example of FIG. 1, a plurality of first application servers 104 are coupled directly or indirectly through one or more networks 108 to an Application Gateway device (AGD) 102. The AGD 102 is coupled directly or indirectly through one or more networks 110 to one or more second application servers 106. The application servers 104, 106 collectively form a distributed set. In this arrangement, the AGD 102 mediates between applications residing on the distributed set of application servers 104, 106, which may be interconnected by a wide area network and/or local area networks. There may be a multitude of AGDs 102 in an installation but one AGD is shown in FIG. 1 for purposes of illustrating a clear example.

In operation, as an application residing on an application server 104 sends a message to an application residing on another application server 106, the message traverses through the AGD 102. The AGD 102 receives packets from the network, constructs a message from the payloads of the packets, and classifies the message to identify its transaction type. The transaction type in turn indicates the processing steps that should be applied to the message; a set of related processing steps is termed a "work-flow." The AGD 102 then applies to the message the work-flow indicated by its transaction type and dispatches the message to the destination application server.

In past approaches, the entire message is reconstructed from the packets before it is classified and the work-flow processing is applied to it. However, embodiments of AGD 102 as disclosed herein do not require reconstructing the entire message, but can classify and apply work-flow processing to message parts as the message parts arrive.

In past approaches, application gateway devices have introduced significant latency or delay in messages moving between application servers due to the presence of the AGD between the servers and the processing performed in the AGD. Latency is a function of several factors, including the number of layers of software on the AGD and the complexity of each layer; the speed of the underlying computing hardware used for the AGD; the complexity of the work-flow and the complexity of tasks at each step of the work-flow; and the efficiency of implementation of the work-flow engine.

When the AGD is implemented on a commercial server using off the shelf software for the lower layers, such as the Linux OS, Java Virtual machine (JVM), Java middleware, etc., each layer adds significant delay to the message processing, adding up to a substantial overall delay overhead even on a fast server. The embodiments provided herein use a design that dispatches message packets out of the AGD with only a minimal delay. The approach herein recognizes that not all messages require the same level of extensive complex workflow and thus a meticulous pre-analysis of work-flows can yield knowledge that can be utilized at run-time to dispatch out packets at the earliest opportunity.

Work-flows may be described in any of several languages including "Business Process Execution Language for Web Services version 1.1," developed jointly by IBM, BEA Systems, Microsoft, SAP AG, Siebel Systems, defined in a specification of 30 Jul. 2002 and available at the time of this writing in the folder/developerworks/library/specification/ws-bpel/ of the domain www-128 of ibm.com on the World Wide Web, and "Web Services Business Process Execution Language Version 2.0, Public Review Draft, 23 Aug., 2006," available at the time of this writing in the document/wsbpel/2.0/wsbpel-specification-draft.html of the domain docs.oasis-open.org.

Business Process Execution Language (BPEL) is intended for application servers running extensive business logic. However, an AGD is typically involved in authentication, secure message dispatch, encryption or decryption of whole or partial messages, compression or decompression, content-specific processing optimizations, and transformation of message content, format, or transport.

A work-flow in this context can be represented as a directed graph, in which each action node in the graph indicates an operation and each conditional node indicates a condition to be evaluated before an appropriate outgoing link from that node can be taken. Advanced concepts may also be represented, such as forks that specify parallel paths, and synchronous or asynchronous interactions between nodes.

The function of a content-based routing work-flow is to determine the destination server for an incoming message. For example, when processing purchasing orders, high value orders or priority orders may be handled by one server while low value orders or low priority orders may be handled by a different server. A gateway can make a routing decision for an order only by a semantic search into the message. This workflow is also helpful in implementing application-level virtualization. For instance, if the message is a SOAP-based web services invocation, then the web service that is invoked and the method that is used, as indicated in the SOAP header, may determine the destination server.

In content based routing, the user specifies the policies based on which the routing decisions can be made. Thus, the routing table is user-defined. Such policies may be expressed using a structured language such as XPath or XQuery, which are based on extensible markup language (XML), and provided to the AGD before the AGD starts processing messages. An AGD matches one of the policies to the message and the matching policy provides a destination server identifier through a routing table lookup.

In one approach, such a work-flow may be implemented using a dynamic proxy that performs the following steps. 1.

Respond to the TCP connection setup messages from the client and act as a proxy for the destination. 2. Process each incoming payload packet against the policies and check if any policy is matched. 2A. If not yet matched, then buffer the packet. 2B. If a match is found then look up for the destination server identifier. 3. Change the packet headers appropriately and pass them on to the destination server in the original packet order. No further proxying is necessary. The delay introduced by the AGD in this scenario is low if the classification can be performed rapidly; only a table look up is needed after the classification before the packets can start on their way. The message content remains unchanged in the AGD.

The destination server identifier in the above work-flow is relatively static and specified in a table. In some approaches, multiple servers may host a specific application and any of them can be a candidate for receiving the incoming message. In such cases, the AGD may load balance between the candidate servers in determining the destination of a message.

One requirement that may conflict with load balancing is the need to maintain affinity among multiple messages. For instance, a request message and its corresponding response message should be handled by the same server. A more complex scenario is where a set of messages together form a transaction. For example, a securities trade message triggers response messages sent to several systems and all such messages together form a transaction. These inter-system messages all pass through the AGD and should to be treated as related or with affinity. The classifier should classify them all as of the same transaction type and the load balancer should choose the same server from among the various candidates to receive all of such messages that belong to one transaction.

The delay introduced by an AGD operating on such a work-flow includes the load balancer algorithm in addition to that of the content-based routing work-flow if the load balancer logic is also in the data path. However, delay attributable to the load balancer is not necessary, since the load balancer logic not dependent on any particular message. By performing the load balancer logic elsewhere, the work-flow can be reduced to content-based routing, thus minimizing the delay introduced by the AGD.

In an embodiment, logic is operable to rewrite each workflow with the goal of modifying each work-flow to a minimal-latency work-flow pattern consisting of <receive, classify, table-look-up for destination, send> steps. In an embodiment, the logic is operable to move any message-independent steps out of the data path. The outgoing message may differ from the incoming one in several ways: content, format (e.g., incoming is HTML and outgoing is XML), and the transport mechanism (e.g., incoming is HTTP and outgoing is FTP). In an embodiment, the logic is operable to check, for each message-dependent step, whether the step and its subsequent steps effect either the content, format, destination, or transport of the outgoing message. If not, then the message dispatch starts in parallel to the work-flow from that step onwards.

2.2 Pre-Analysis of Workflow

Figure 2:
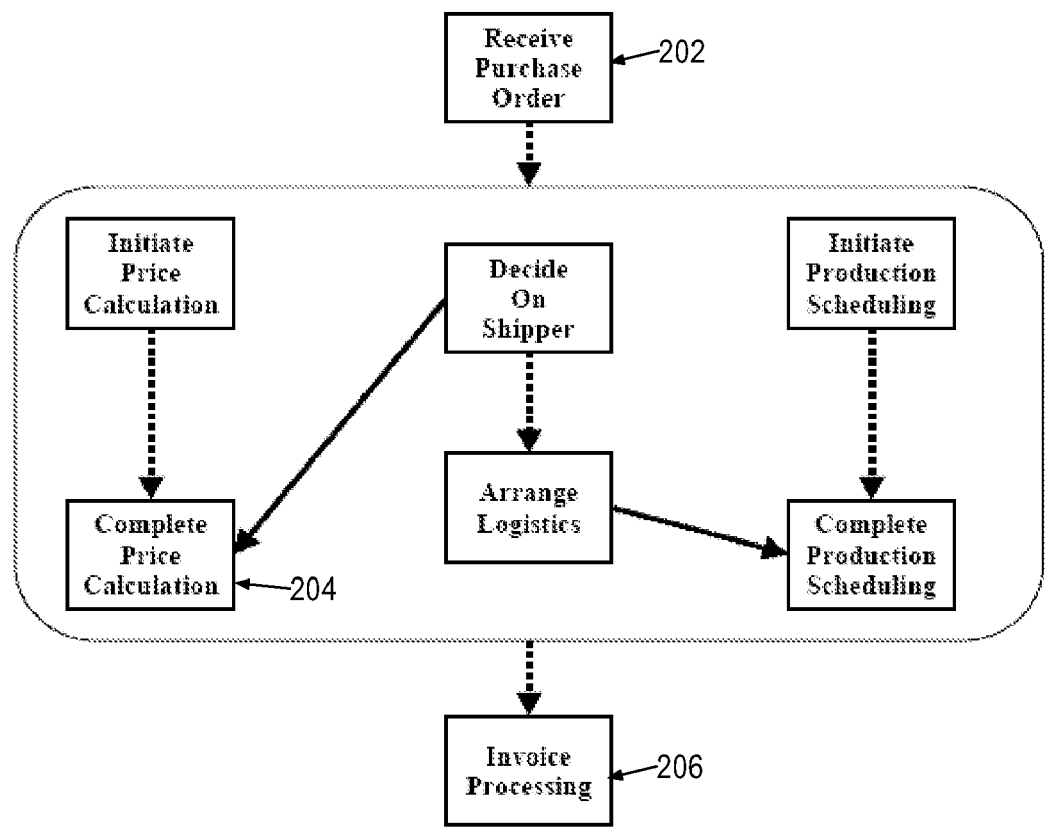
FIG. 2 illustrates an example workflow.

FIG. 2 illustrates an example workflow. A message comprising a purchase order is received at step 202 and a number of steps within box 204 are performed in response to the message. The message is then subjected to invoice processing in step 206. In FIG. 2, solid lines show synchronous dependencies while the broken lines depict sequencing relationships.

The functions inside box 204 may be implemented in an application server. Assume that an AGD is acting as an intermediary between a client initiating the purchase order and the server receiving that request, and servers running the applications. Since three independent tasks should start simultaneously, the AGD should send three copies of the incoming purchase order if a different application server handles each of these tasks. Each of the applications receiving copies of the purchase order may need the purchase order in a different format, over a different transport. The three tasks when completed generate results, some of which may have to be exchanged and will pass through the AGD again. The AGD may have to treat these messages as part of the same transaction and route them with affinity. Finally, an invoice is generated for the purchase order and the invoice may have to be treated as part of same transaction for the purposes of visibility.

Figure 3:
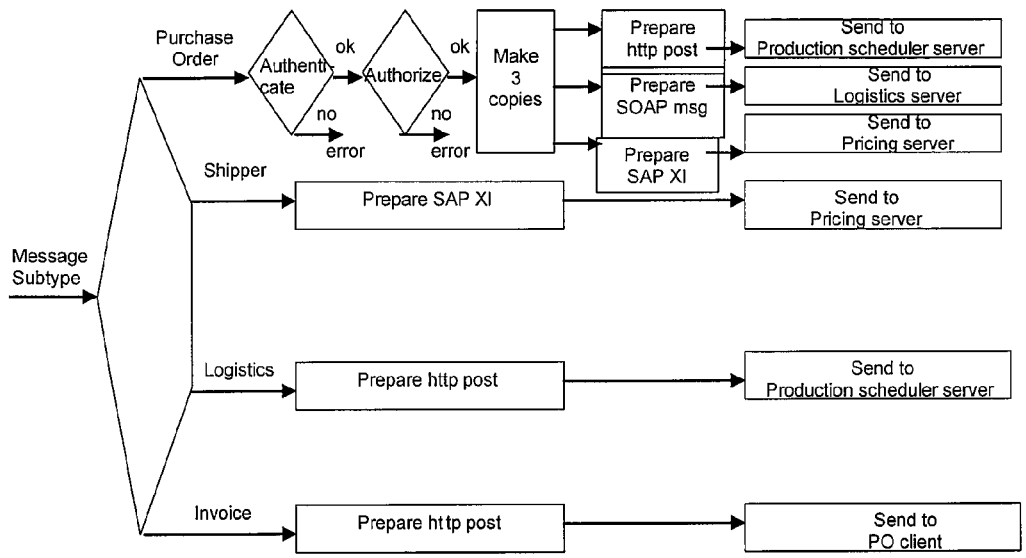
FIG. 3 illustrates an example workflow as performed in an application gateway device and representing the process of FIG. 2.

FIG. 3 illustrates an example work-flow as performed in an application gateway device and representing the process of FIG. 2. FIG. 3 assumes that any load balancing logic for handling multiple servers of the same application and for maintaining transaction affinity is offline (that is, implemented in the underlying infrastructure, not in the work-flow itself) and is not part of the AGD work-flow. Further, the workflow of FIG. 3 assumes that only incoming messages need authentication and authorization, and that responses do not use authentication and authorization. Administrative functions such as logging, error handling, etc., are omitted for clarity.

The work-flow of FIG. 3 can be optimized to reduce latency according to an embodiment in the following manner. The first branch of the work-flow is clearly the most complex. The other branches already adhere to the minimal-latency work-flow pattern described above. Since most messages are successfully authenticated and authorized in practice, an optimistic optimization approach can be created.

Figure 4:
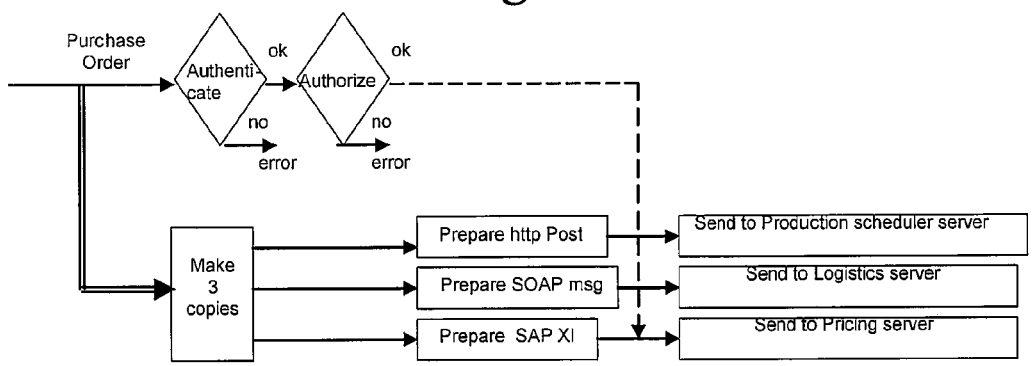
FIG. 4 illustrates an optimistic optimization of one branch of the workflow of FIG. 3.

FIG. 4 illustrates an optimistic optimization of one branch of the workflow of FIG. 3. In FIG. 4, the work-flow provides that outgoing message formats are prepared, ready to be dispatched as soon as authorization succeeds. Thus, authentication and authorization steps are handled in parallel to the message preparation. However, when the purchase order is not authenticated or authorized, the work done in preparing the outgoing message packets is wasted, but this condition should occur only rarely. In the vast majority of cases, message latency can be significantly reduced, particularly in a multi-processor or multi-core processor system. Latency may be further reduced when a specialized hardware accelerator is employed for the authentication or authorization functions.

2.3 Workflow Rewriting

In an embodiment, latency minimization is achieved using the automated analysis and re-write of each work-flow in logic implemented in an application gateway device.

Figure 5:
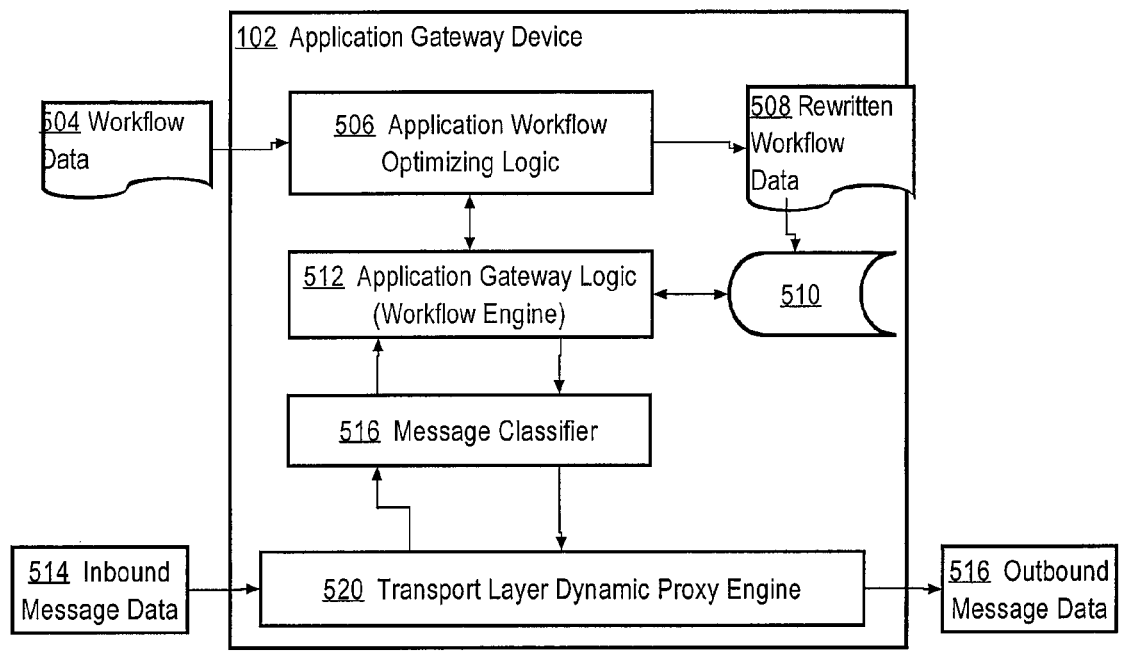
FIG. 5 illustrates an example of architecture for an application gateway device.

FIG. 5 illustrates an example of architecture for an application gateway device. An application gateway device 102 comprises application workflow optimizing logic 506 coupled to application gateway logic 512, which may be denoted a workflow engine. The application gateway logic 512 is coupled to a message classifier 516 and to a database 510. The message classifier 516 is coupled to a transport layer dynamic proxy engine 520. In an embodiment, application workflow optimizing logic 506 and application gateway logic 512 may be integrated together in unit having the functions described herein.

Figure 6:
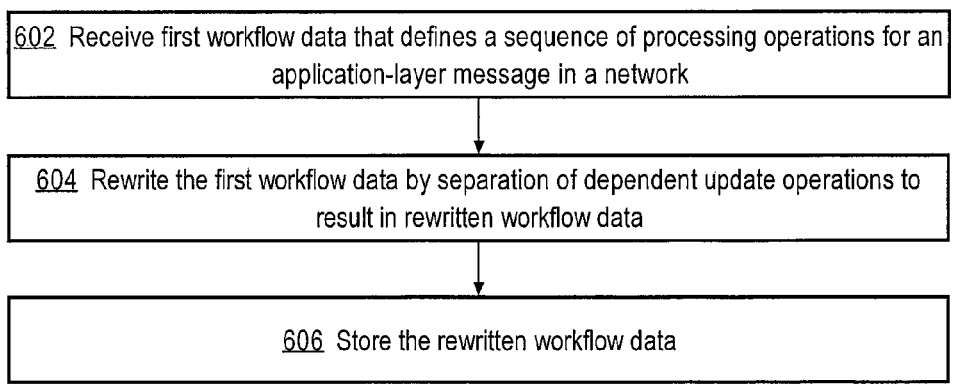
FIG. 6 illustrates a method of rewriting workflow data.

Application workflow optimizing logic 506 is configured to receive workflow data 504, rewrite the workflow according to specified rules or logical steps, resulting in creating and storing rewritten workflow data 508 in database 510, as described further herein in relation to FIG. 6. Transport layer dynamic proxy engine 520 is configured to receive inbound message data 514 over a transport layer connection. In an embodiment, inbound message data 514 comprises an IP packet, but in other embodiments, other formats of message data may be processed. In an embodiment, transport layer dynamic proxy engine 520 is a TCP proxy that terminates a TCP connection, but in other embodiments other transport protocols may be used.

Transport layer dynamic proxy engine 520 passes payload data from the inbound message data 504 to the message classifier 516, which is configured to identify a message represented in the payload data of one or more sets of received inbound message data 514. For example, multiple packets may be classified as one message of a particular type or classification.

The message classifier 516 is configured to provide a complete message and classification information to the application gateway logic 512. The application gateway logic 512 is configured to select rewritten workflow data 508 from the database 510 and apply the rewritten workflow data to the message to result in matching the message to a particular workflow pattern, as described further herein in relation to FIG. 7.

In an embodiment, each of the transport layer dynamic proxy engine 520, message classifier 516, application gateway logic 512, and application work-flow optimizing logic 506 is operable to process incremental fractions of a message.

In an embodiment, AGD 102 is coupled as an intermediary between applications running on applications servers as shown in FIG. 1. Generally, AGD 102 centralizes utility functions common to all applications, such as authentication, authorization, identity management, virtualization, visibility, transformation, and protocol adaptation. Thus, the functionality of the AGD 102 is different from the functions of application servers 104, 106.

The AGD 102 may physically reside at the edge of an enterprise network or within a network of an enterprise or other entity. The AGD 102 may be configured as a logical hub coupled to spokes comprising the application servers 104, 106. Multiple AGDs 102 may be deployed in a network and treated as a single logical entity.)

FIG. 6 illustrates a method of rewriting workflow data. In step 602, first work-flow data is received, and the first work-flow data defines a sequence of processing operations for an application-layer message in a network. In step 604, the first work-flow data is rewritten by separating dependent update operations, to result in rewritten work-flow data. In step 606, the rewritten work-flow data is stored.

In an embodiment, step 604 may comprise a plurality of sub-steps that are described further in other sections below. Thus, step 604 may broadly represent a data processing algorithm, implemented in software, hardware, firmware, the logical elements of FIG. 5, or any combination thereof, according to the sub-steps that are further described below.

Figure 7:
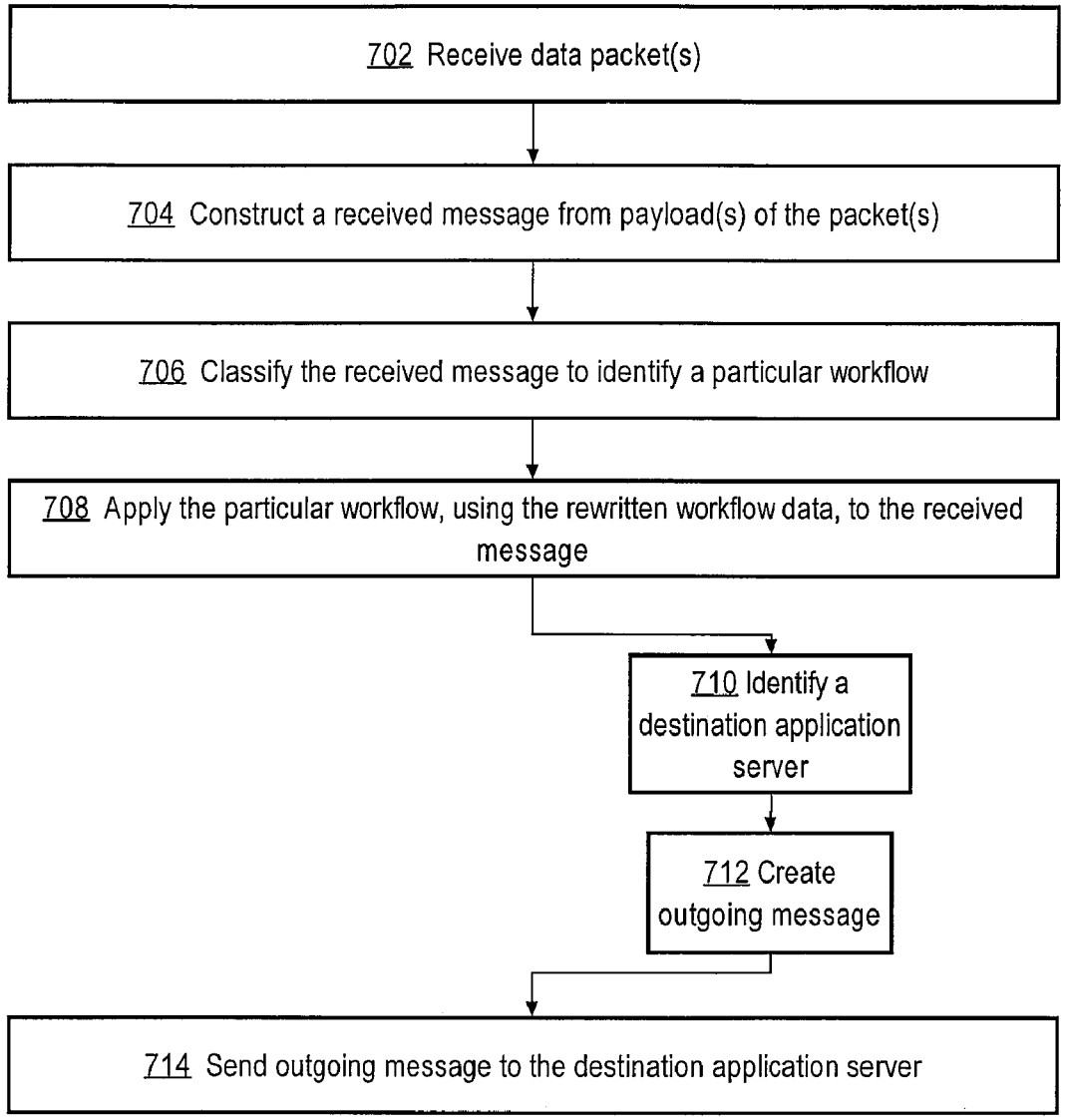
FIG. 7 illustrates a method of applying a workflow to a message.

FIG. 7 illustrates a method of applying a workflow to a message. In step 702, one or more data packets are received. In step 704, a received message is constructed from one or more payloads of the packets. In an embodiment, the message is a message structured at Open Systems Interconnect Layer 5, Layer 6 or Layer 7—that is, the message is an application-layer message as opposed to a packet, segment, or other message.

In step 706, the received message is classified to identify a particular workflow. Classification comprises determining the protocol or transaction type associated with a message and may include determining an application program associated with a message. In an embodiment, message classification results in determining a transaction type value, which maps to a work-flow identifier for a work-flow in the database, and a message type value.

In an embodiment, the message classification is completed as early as possible, by using the fewest number of message packets. For instance, most messages can be classified before the end of the first packet itself, such as messages that can be classified based on the HTTP or SOAP headers. Conversely, Web services and or general XML messages may need scanning of more than one packet. Though it is theoretically possible to construct work-flows where all packets of a message must be buffered in an AGD and the first packet can only be dispatched after the entire message is processed by the work-flow, work-flows in practice tend to be much simpler and allow significant optimizations.

Based on the message classification, one of the rewritten work-flow data is selected from the database and applied to the received message at step 708. As a result, a destination application server for the message is identified at step 710, and an outgoing message is created at step 712. The outgoing message 712 may comprise a transformation of the transport, payload, or protocol(s) represented in the received message. In step 714, the outgoing message is sent to the destination application server.

In an embodiment, rewriting a work-flow at step 604 may involve the following process. For purposes of rewriting a work-flow, each work-flow can be treated as a directed graph having one or more end nodes each having incoming links but no outgoing links. Often, the graph may be acyclic. The start node of a work-flow is assumed to represent "receive message" and all end nodes are assumed to comprise either "send message" or "do not send message" (or another node having a similar effect such as throw error, record log entry, etc.

In an embodiment, work-flow rewriting comprises the following automated data processing steps:

1. Label each node as an Update node, Computation node, Branch node, Merge node, or Information supplier node. An Update node changes or determines at least one of the format, content, transport and destination(s) of the message. A Computation node performs a computation based on the message contents or external information. Nodes that extract a subset of the message headers/content are also considered computation nodes A Branch node chooses a proper subset (usually one) of their outgoing links when acting on a message. A Merge node has multiple incoming links. An Information supplier node compute, gather or extract information and pass the information to update node(s). For instance, information from a database or table is retrieved based on an extracted entity from the message and used to change the message headers or content.

2. For each end node n, find the subgraph S(n) such that: It contains the start node, it is connected, there is no path from any node not in S(n) to n, and there is no node m in S(n) such that there is no path from m to n.

3. Perform parallelization of trailing computation as follows. Let n be an end node and m a nearest update node in S(n). If there are any nodes between m and n, then create a parallel path consisting of the partial path from m to n, excluding both m and n, and with a link from m to the first node in that path. Then replace the current path from m to n by a single link from m to n.

For example, let such a path be m, k, p, q, n. Two parallel paths are created: m, k, p, q, and a single link from m to n.

4. Perform separation of dependent updates as follows. Let m be an update node and k an information supplier node with a link into m. Collect all such nodes k supplying m and any computation nodes q that extract the entities that k uses to generate the information it supplies to m. Parallelize any sub-paths in S(n) between such nodes q and k and place a direct link from q to k. In essence, this process shrinks the neighborhood of m such that all computation nodes that extract information and supply to nodes k are exactly two steps away from m and all such nodes k are at exactly one step from m. Any other nodes previously between them are now on parallel sub-paths.

For instance, consider the path p, q, k, m where p and q extract entities from the message, and k uses these to supply some information to m. The path is transformed to two paths: p, k, i, j, m and q, k, m, making both p and q direct predecessors to k. A parallel path is also created: k, i, j. There is no need for a link from j to m anymore since neither i nor j contribute to the updates that m makes.

5. Perform parallelization of leading computes as follows. Let s be the start node and m a nearest update node in S(n). Assume also that none of the nodes in a path from s to m is an information supply node to m. In this case, the sub-path is parallelized with a direct link from s to m.

For instance, let s, p, q, r, m be a path and none of p, q, r is an information supply node nor an update node. Two paths are created: s, m and s, p, q, r. Any other links these nodes have are retained.

6. Perform branch prediction as follows. Let b be a branch node and that an end node m is accessible from b. Assume that the particular branch that leads from b to m is of high probability. This probability can be computed in several ways, including through a learning process that is offline and will not be part of the work-flow. Let k be the node with a link into b. In this case, b is bypassed, by creating a parallel path from k to m without b. A direct link is also created from b to m, indicating that m cannot be executed until k is and the result is known.

The preceding steps are applied in the order stated above. Each step is applied to all eligible nodes before the next step is performed. Several other variations in order also may be used, although the ultimate result does not change.

The preceding steps are now illustrated with reference to the work-flow of FIG. 3.

Figure 8A:
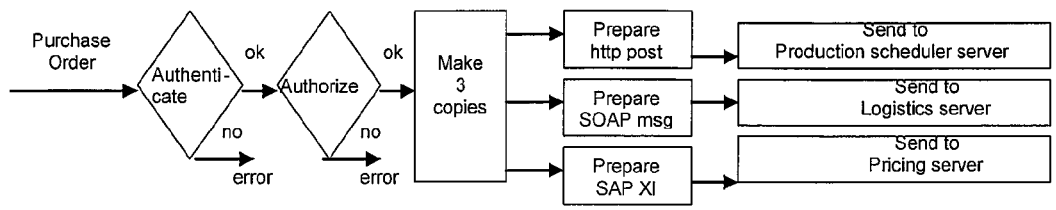
FIG. 8A illustrates a first branch of the workflow of FIG. 3.
Figure 8B:
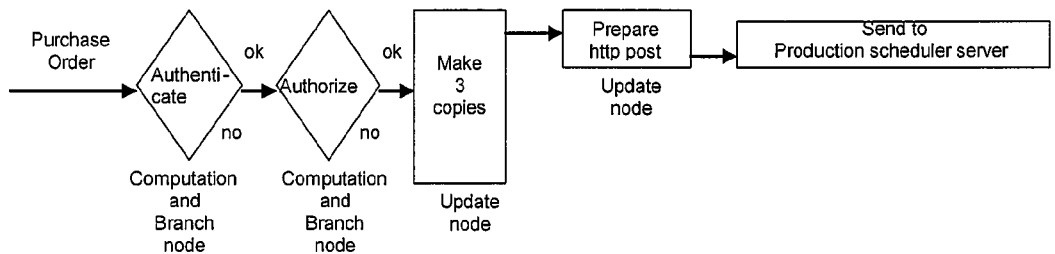
FIG. 8B illustrates a sub-graph of the branch of FIG. 8A with node labels.

FIG. 8A illustrates a first branch of the workflow of FIG. 3. In the example of FIG. 8A, all three end nodes here can be treated identically. For purposes of illustrating an example, one of the end nodes is addressed herein and the sub-graph corresponding to that end node is constructed. The sub-graph may be denoted as the sub-graph S(n) where n is the end node. In the sub-graph, the nodes are labeled by their type. FIG. 8B illustrates a sub-graph of the branch of FIG. 8A with node labels.

The preceding steps are applied to the sub-graph of FIG. 8A. Parallelization of trailing computation does not apply since the end node is preceded by an update node. Separation of dependent updates also does not apply since there is no information supplier node in this graph.

Figure 8C:
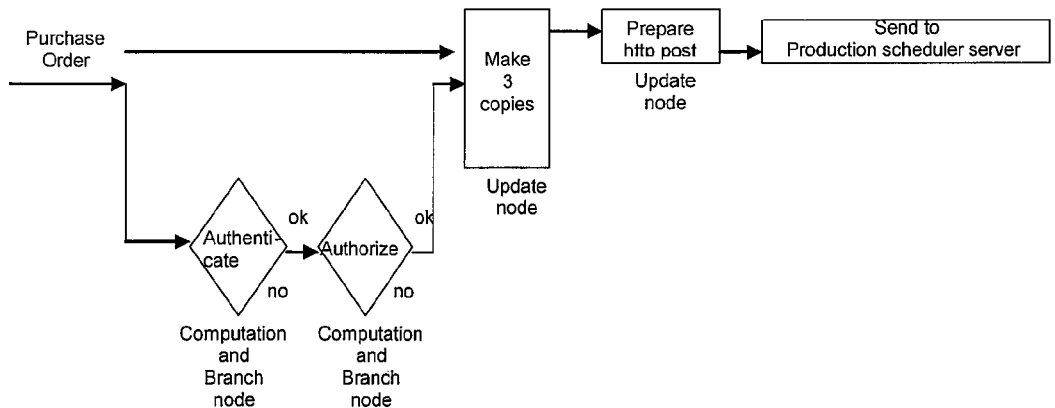
FIG. 8C illustrates the branch of FIG. 8A after rewriting using workflow rewriting approaches described herein.

Parallelization of leading computes applies since both Authenticate and Authorize nodes are leading compute nodes, as well as branch nodes. As a result, a re-written work-flow is created. FIG. 8C illustrates the branch of FIG. 8A after rewriting using workflow rewriting approaches described herein.

The branch prediction process is next applied. In the present example, the sub-graph remains unaltered because the process assumes that the "ok" branches are the most probable.

2.4 Run-Time Message Processing

In an embodiment, as described in the previous section, all work-flows are pre-analyzed when they are defined using logic in the AGD. Pre-analysis results in re-writing the user-specified work-flows into functionally equivalent work-flows in which all steps not contributing to any changes in the message in its content, format, transport, or destination are moved into parallel paths. Thus, the re-writing creates the shortest possible path from message reception to message dispatch, while pushing all the other steps into parallel paths. In most cases, the message dispatch step no longer has dependencies on these parallel paths. Therefore, one or more parts of a message can be dispatched out while the parallel paths are still executing. The rewritten work-flows seek to minimize delays in the dispatch of packets used for classification, and to dispatch all subsequent packets with minimal necessary processing applied to them.

In an embodiment, run-time operation of AGD 102 comprises the following. First, the AGD 102 acts as a dynamic proxy for the application servers. The AGD 102 responds to transport session initiation messages from a client and receives messages or packets. The AGD 102 classifies the message as early as possible, making incremental progress as packets come in, so that the classification is complete as soon as the last packet necessary to meet the classification criteria is processed.

The AGD 102 determines a transaction type for a message from the classification process, selects a corresponding work-flow, and initiates execution of the re-written version of the work-flow. Messages or packets may be arriving during classification, but such messages stay unprocessed unless the work-flow requires them to be processed. Classification yields the following items: the transaction type (this directly maps to the work-flow id) and the message type.

The AGD 102 then applies any necessary updates to the message incrementally, as packets are received, without having to wait until the end of the message, unless the work-flow requires. The AGD 102 dispatches outgoing packets as soon as each packet can be released, again based on the work-flow requirements.

3.0 Implementation Mechanisms—Hardware Overview

Figure 9:
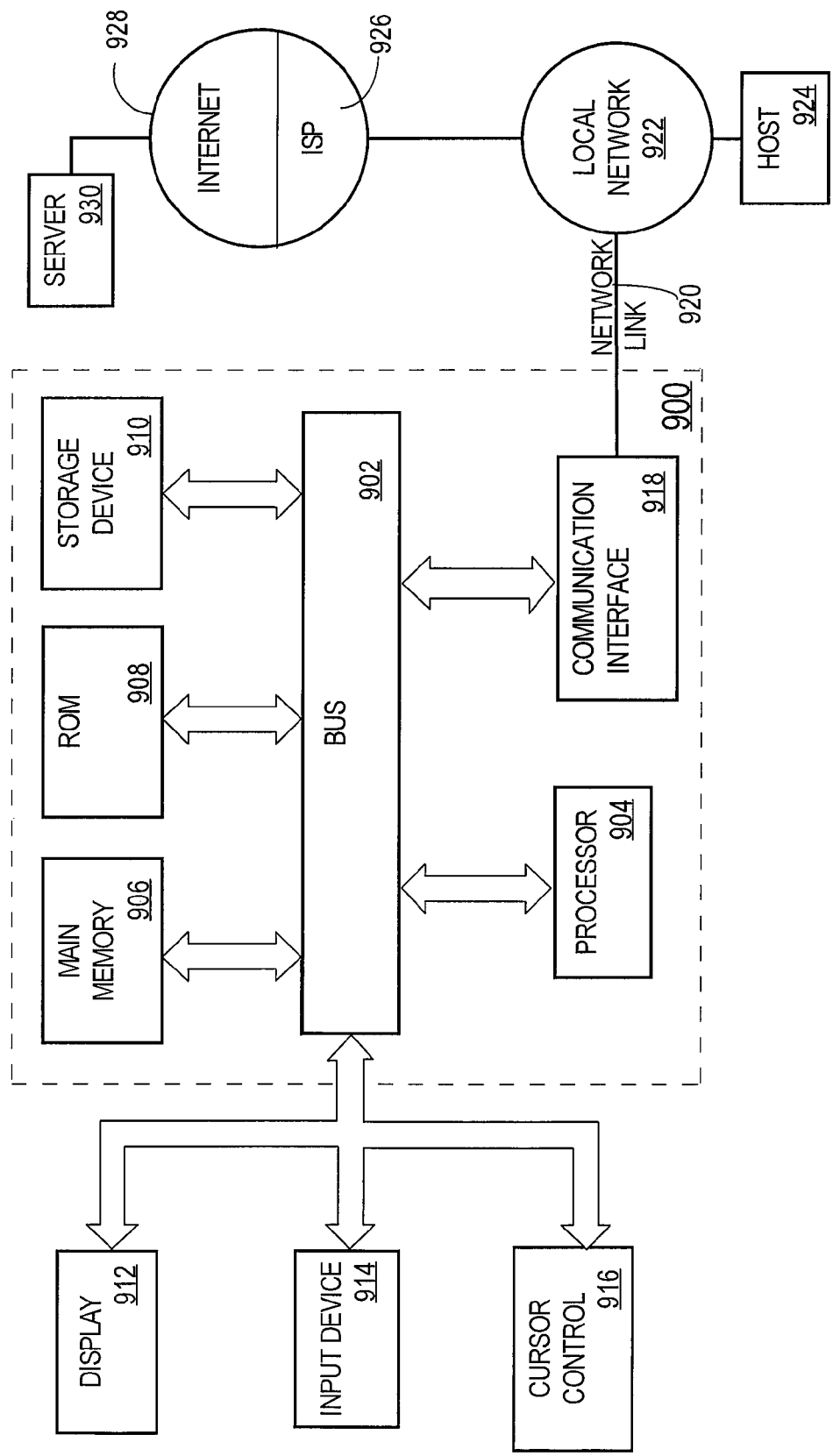
FIG. 9 illustrates a computer system upon which an embodiment may be implemented.

FIG. 9 is a block diagram that illustrates a computer system 900 upon which an embodiment may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein.

In alternative embodiments, hard-wired circuitry may be used in place of or in combination with software instructions to implement embodiments. Such circuitry may include application-specific integrated circuits, firmware such as PROM, EPROM, or EEPROM storing instructions, and other circuitry implementing logic in gates, transistors or other electronic digital hardware. Each step or block of a flowchart or flow diagram shown herein may be implemented in a logic unit of such hardware. An embodiment may comprise a special-purpose computer that comprises such logic units coupled to a processor, memory, or other functional components of electronic digital hardware. Thus, embodiments are not limited to any specific combination of hardware circuitry and software. Software per se is not required to implement all embodiments.

The term "machine-readable medium" as used herein refers to any data storage medium that participates in providing data that causes a machine to operation in a specific fashion. In an embodiment implemented using computer system 900, various machine-readable media are involved, for example, in providing instructions to processor 904 for execution. Such a storage medium may take many forms, including but not limited non-volatile media and volatile media. Non-volatile media includes, for example, optical or magnetic disks, such as storage device 910. Volatile media includes dynamic memory, such as main memory 906. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other storage medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

4.0 Extensions and Alternatives

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing system, comprising:
one or more hardware processors;
application workflow optimizing logic which when executed by the one or more hardware processors is operable to:
receive first workflow data that defines a sequence of processing operations to perform such operations on an application-layer message;
wherein the sequence of processing operations form a path defined by the first workflow data and the path includes one or more processing operations that change the content of the application-layer message and one or more processing operations that do not change the content of the application-layer message;
select, from the sequence of processing operations defined by the first workflow, one or more processing operations that do not change the content of the application-layer message;
rewrite the first workflow data to generate functionally equivalent rewritten workflow data by moving the selected one or more processing operations from the path defined by said first workflow data to a parallel path;

wherein moving the selected one or more processing operations removes the selected one or more processing operations from the path defined by the first workflow data and links remaining processing operations of the sequence of processing operations that form the path;

store the rewritten workflow data in a data repository.

2. The data processing system of claim 1, further comprising application gateway logic operable to:

receive one or more packets;

construct a received message from one or more payloads of the packets;

classify the received message to identify a particular workflow associated with the message;

apply the particular workflow, using the rewritten workflow data, to the received message to result in identifying a destination application server and creating an outgoing message;

send the outgoing message to the destination application server.

3. The data processing system of claim 1, wherein the rewriting further comprises rewriting the first workflow data by parallelization of trailing computation operations.

4. The data processing system of claim 1, wherein the rewriting further comprises rewriting the first workflow data by parallelization of leading computation operations.

5. The data processing system of claim 1, wherein the rewriting further comprises rewriting the first workflow data by branch prediction.

6. The data processing system of claim 2, wherein the application gateway logic is further operable to classify the received message using one or more incremental classification operations, wherein each of the incremental classification operations operates on one or more parts of the packets as the one or more packets are received.

7. The data processing system of claim 6, wherein the application gateway logic is operable to apply one or more updates, which are defined in the rewritten workflow data, to the received message incrementally as the one or more parts of the packets are received.

8. The data processing system of claim 7, wherein the application gateway logic is operable to send the outgoing message to the destination application server before receiving all packets of the received message.

9. The data processing system of claim 1, wherein the application-layer message, the received message, and the outgoing message are Layer 6 messages or Layer 7 messages.

10. A non-transitory machine-readable storage medium carrying one or more sequences of instructions, which instructions, when executed by one or more processors, cause the one or more processors to perform:

receiving first workflow data that defines a sequence of processing operations to perform such operations on an application-layer message;

wherein the sequence of processing operations form a path defined by the first workflow data and the path includes one or more processing operations that change the content of the application-layer message and one or more processing operations that do not change the content of the application-layer message;

selecting, from the sequence of processing operations defined by the first workflow, one or more processing operations that do not change the content of the application-layer message;

rewriting the first workflow data to generate functionally equivalent rewritten workflow data by moving the selected one or more processing operations from the path defined by said first workflow data to a parallel path;

wherein moving the selected one or more processing operations removes the selected one or more processing operations from the path defined by the first workflow data and links remaining processing operations of the sequence of processing operations that form the path;

storing the rewritten workflow data in a data repository.

11. The non-transitory machine-readable storage medium of claim 10, further comprising instructions which when executed cause:

receiving one or more packets;

constructing a received message from one or more payloads of the packets;

classifying the received message to identify a particular workflow associated with the message;

applying the particular workflow, using the rewritten workflow data, to the received message to result in identifying a destination application server and creating an outgoing message;

sending the outgoing message to the destination application server.

12. The non-transitory machine-readable storage medium of claim 10, wherein the rewriting further comprises rewriting the first workflow data by parallelization of trailing computation operations.

13. The non-transitory machine-readable storage medium of claim 10, wherein the rewriting further comprises rewriting the first workflow data by parallelization of leading computation operations.

14. The non-transitory machine-readable storage medium of claim 10, wherein the rewriting further comprises rewriting the first workflow data by branch prediction.

15. The non-transitory machine-readable storage medium of claim 11, wherein the application gateway logic is further operable to classify the received message using one or more incremental classification operations, wherein each of the incremental classification operations operates on one or more parts of the packets as the one or more packets are received.

16. The non-transitory machine-readable storage medium of claim 11, wherein the application gateway logic is operable to apply one or more updates, which are defined in the rewritten workflow data, to the received message incrementally as the one or more parts of the packets are received.

17. The non-transitory machine-readable storage medium of claim 16, wherein the application gateway logic is operable to send the outgoing message to the destination application server before receiving all packets of the received message.

18. The non-transitory machine-readable storage medium of claim 10, wherein the application-layer message, the received message, and the outgoing message are Layer 6 messages or Layer 7 messages.

19. A machine-implemented method, comprising:

receiving first workflow data that defines a sequence of processing operations to perform such operations on an application-layer message;

wherein the sequence of processing operations form a path defined by the first workflow data and the path includes one or more processing operations that change the content of the application-layer message and one or more processing operations that do not change the content of the application-layer message;

selecting, from the sequence of processing operations defined by the first workflow, one or more processing operations that do not change the content of the application-layer message;

rewriting the first workflow data to generate functionally equivalent rewritten workflow data by moving the selected one or more processing operations from the path defined by said first workflow data to a parallel path;

wherein moving the selected one or more processing operations removes the selected one or more processing operations from the path defined by the first workflow data and links remaining processing operations of the sequence of processing operations that form the path;

storing the rewritten workflow data in a data repository;

the method performed by one or more computing devices.

20. The method of claim 19, further comprising:

receiving one or more packets;

constructing a received message from one or more payloads of the packets;

classifying the received message to identify a particular workflow associated with the message;

applying the particular workflow, using the rewritten workflow data, to the received message to result in identifying a destination application server and creating an outgoing message;

sending the outgoing message to the destination application server.

21. The method of claim 19, wherein the rewriting further comprises rewriting the first workflow data by parallelization of trailing computation operations.

22. The method of claim 19, wherein the rewriting further comprises rewriting the first workflow data by parallelization of leading computation operations.

23. The method of claim 19, wherein the rewriting further comprises rewriting the first workflow data by branch prediction.

24. The method of claim 19, further comprising classifying the received message using one or more incremental classification operations, wherein each of the incremental classification operations operates on one or more parts of the packets as the one or more packets are received.

25. The method of claim 24, further comprising applying one or more updates, which are defined in the rewritten workflow data, to the received message incrementally as the one or parts of the packets are received.

26. The data processing system of claim 1, further comprising application gateway logic operable to:

construct a received message from one or more packets;

apply a particular workflow, using the rewritten workflow data, to the received message to create an outgoing message;

send one or more parts of the outgoing message to a destination application server while processing operations of the parallel path are executing.

27. The non-transitory machine-readable medium of claim 10, further comprising instructions, which, when executed, cause:

constructing a received message from one or more packets;

applying a particular workflow, using the rewritten workflow data, to the received message to create an outgoing message;

sending one or more parts of the outgoing message to a destination application server while applying processing operations of the parallel path to the received message.

28. The method of claim 24 further comprising:

constructing a received message from one or more packets;

applying a particular workflow, using the rewritten workflow data, to the received message to create an outgoing message;

sending one or more parts of the outgoing message to a destination application server while applying processing operations of the parallel path to the received message.

* * * * *